US008411304B2

(12) United States Patent
Kibler et al.

(10) Patent No.: US 8,411,304 B2
(45) Date of Patent: Apr. 2, 2013

(54) METHOD AND SYSTEM FOR AUTOMATIC SHARING AND CUSTOM USER INTERFACE FEATURES IN A FLEET OF MULTI-FUNCTION DEVICES

(75) Inventors: Wendell L. Kibler, Ontario, NY (US); Arturo M. Lorenzo, Fairport, NY (US); Robert J. St. Jacques, Jr., Fairport, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 900 days.

(21) Appl. No.: 12/495,140

(22) Filed: Jun. 30, 2009

(65) Prior Publication Data

US 2010/0328705 A1     Dec. 30, 2010

(51) Int. Cl.
G06F 3/12       (2006.01)
G06F 15/173    (2006.01)
G06F 15/16     (2006.01)
H04N 1/42      (2006.01)

(52) U.S. Cl. ...... 358/1.15; 358/1.13; 358/476; 709/226; 709/238; 709/245

(58) Field of Classification Search ................ 358/1.15, 358/1.13, 401, 402, 403, 448, 476; 709/202, 709/245, 226, 235, 238, 203, 232, 242, 249; 707/107, 821, 822, 827, 805, 809, 785, 769; 710/105, 40, 112, 116, 121, 117, 118, 243, 710/35, 31, 39, 261, 45, 262, 61
See application file for complete search history.

(56) References Cited

U.S. PATENT DOCUMENTS

| | | | |
|---|---|---|---|
| 5,920,405 A | 7/1999 | McIntyre et al. | 358/442 |
| 7,474,428 B2 | 1/2009 | Morris-Jones et al. | 358/1.15 |
| 7,525,676 B2 | 4/2009 | Pesar | 358/1.13 |
| 2005/0275862 A1* | 12/2005 | Matsumoto et al. | 358/1.13 |
| 2008/0252936 A1 | 10/2008 | Stratton | 358/403 |
| 2008/0303803 A1 | 12/2008 | O'Brien et al. | 345/184 |
| 2009/0228892 A1* | 9/2009 | Di Luoffo et al. | 718/104 |
| 2010/0094925 A1* | 4/2010 | St Jacques et al. | 709/202 |

OTHER PUBLICATIONS

Trunfio et al., Peer-to-Peer Resource Discovery in Grids, Dec. 2006, ScienceDirect, www.sciencedirect.com, all pages.*
Cao et al., P2PGrid: Intergrating P2P Netwoks into Grid Enviroment, 2005, LNCS 3795, pp. 871-883.*
Xerox, Xerox WorkCentre, 2008, Xerox, all pages.*
Xerox, Xerox EIP, May 2008, Xerox, all pages.*

(Continued)

Primary Examiner — Benny Q Tieu
Assistant Examiner — Ngon Nguyen
(74) Attorney, Agent, or Firm — Kermit D. Lopez; Luis M. Ortiz; Tuesday A. Kaasch (57) ABSTRACT

A method and system for enabling automatic service sharing and custom user interface features in a fleet of multi-function devices. EIP (Extensible Interface Platform) services can be registered via a peer-to-peer discovery subsystem associated with a multi-function device grid infrastructure. EIP service registration information can be submitted and stored in the grid infrastructure. The multi-function devices can be equipped with an enterprise EIP client, which can query the discovery subsystem and apply a corporate policy. The discovery subsystem detects the optimal instance of the service based on loading and availability factors and then returns a reference with respect to the services that allows access to enhanced services. Such an approach enables a fleet of multi-function devices to dynamically discover EIP services and auto populate service options to provide increased capability, reduced complexity, and improved speed.

17 Claims, 5 Drawing Sheets

OTHER PUBLICATIONS

Fox et al., Peer-to-Peer Grids, Jan. 2003, Syracuse University, Syracuse University Electrical Engineering and Computer Science, all pages.*

Iamnichi et al., A Peer-to-Peer Approach to Resource Discovery in Grid Environment, Mar. 2002, University of Chicago Department of Computer Science, all pages.*

Xerox Extensible Interface Platform (EIP), Xerox, May 8, 2006.

Nuance Announces PaperPort Personalized Scanning Platform, Revolutionizing Scan-to-Desktop from Network MFP Devices; News Release; Nuance Communications, Inc., AllMexpo 2007, Boston, Apr. 17, 2007.

Equitrac Embedded for Xerox Extensible Interface Platform, Equitrac Corporation, 2008.

* cited by examiner

METHOD AND SYSTEM FOR AUTOMATIC SHARING AND CUSTOM USER INTERFACE FEATURES IN A FLEET OF MULTI-FUNCTION DEVICES

TECHNICAL FIELD

Embodiments are generally related to rendering devices such as printers, scanners, multi-function devices, photocopy machines, and the like. Embodiments are also related to extensible interface platforms associated with multi-function devices. Embodiments are additionally related to automatic service sharing and custom user interface features utilized in the context of a fleet of multi-function devices.

BACKGROUND OF THE INVENTION

Networked multi-function devices generally interact with an assemblage of varying rendering devices, client computers, servers, and other components that are connected to and communicate over a network. An example of a typical multi-function device is a rendering device having combined printing, scanning, faxing, and/or photocopying capabilities.

Multi-function devices generally support EIP (Extensible Interface Platform) services which permit custom services to be installed and represented in a GUI (Graphical User Interface) associated with the multi-function device. For example, an invoice button associated with such a GUI may, when selected, simultaneously transmit an invoice to a particular organizational department while archiving the information in an associated document management database for easy retrieval. Such EIP services typically require manual registration and configuration which can be a time-consuming and tedious process when a newly deployed service is required to appear with respect to a large number of multi-function devices.

Figure 1:
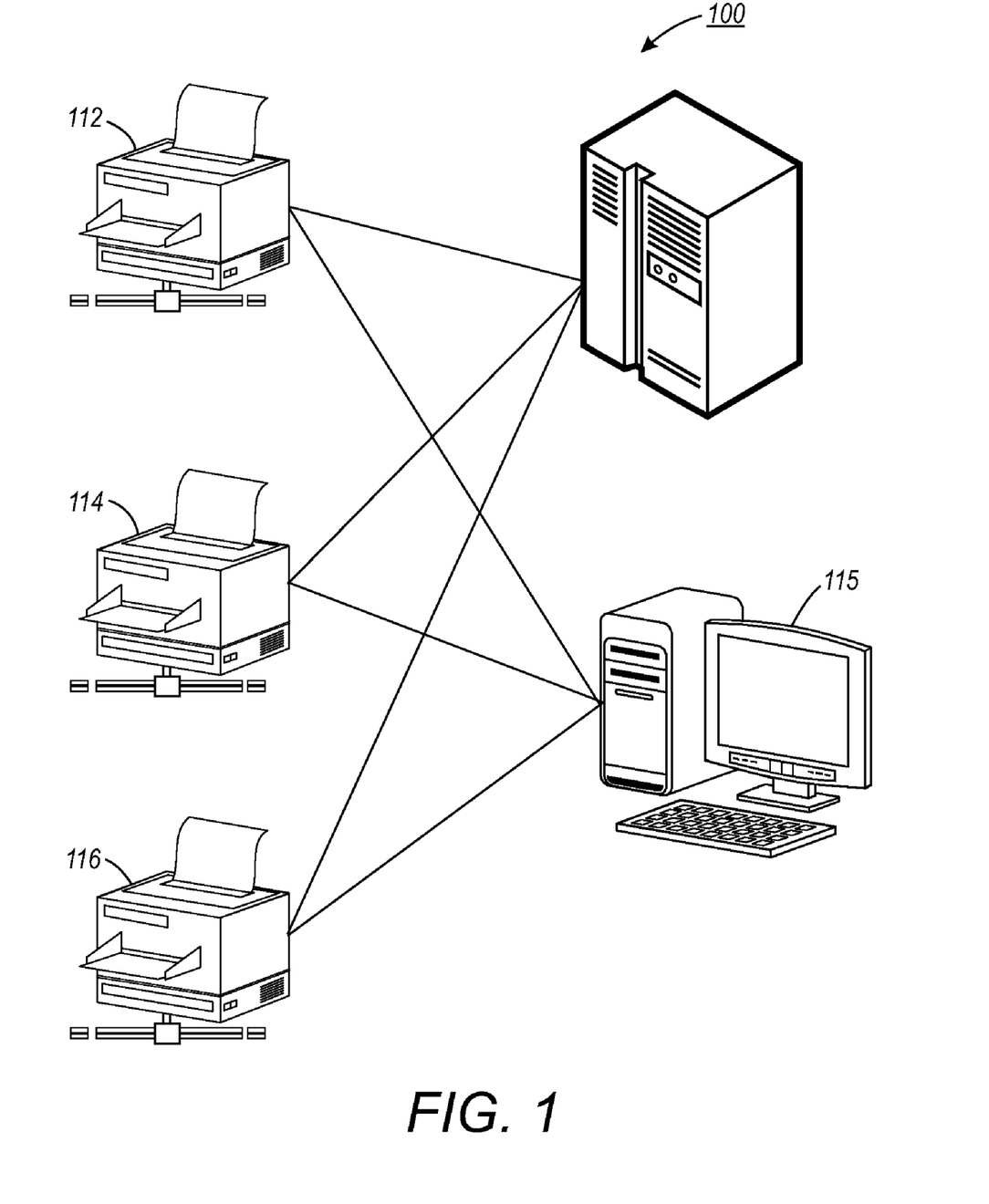
FIG. 1 illustrates a schematic diagram of a prior art EIP configuration network.

FIG. 1 illustrates a prior art EIP configuration network 100 associated with an EIP server 110, a registrar 115, and one or more multi-function devices 112, 114 and 116. A single instance of an EIP service can be installed as a web application on the EIP web server 110. The registrar 115 then registers the EIP service with each of the multi-function devices 112, 114 and 116 on which the service should be available. The registration can be processed through a GUI into which the user inputs the URL (Uniform Resource Locator) of the service as well as other important details such as, for example, the location of images utilized as icons in the GUI associated with the multi-function devices 112, 114 and 116. The registration may also be processed as a web service call.

Furthermore, the EIP registration may be repeated manually three times with respect to the multi-function devices 112, 114 and 116. Each time the EIP service is utilized, the web application hosted on the EIP server 110 can be invoked. Such registrations, however, are associated with the single web EIP server 110. Thus, if the server slows or is overloaded, or a parallel server is added to the network, the registrations must be updated manually from the registrar 115 to point to a new location or URL. Note that registration involves storing a reference regarding a specific service in a persistent memory of a specific multi-function device.

One of the problems associated with such an approach is that the multi-function device service association remains until the registration is deleted or modified by the registrar software. Also, the EIP registration system 100 cannot dynamically allocate services. Additionally, the management of a large number of services and/or a large number of multi-function devices can quickly become very problematic.

Figure 2:
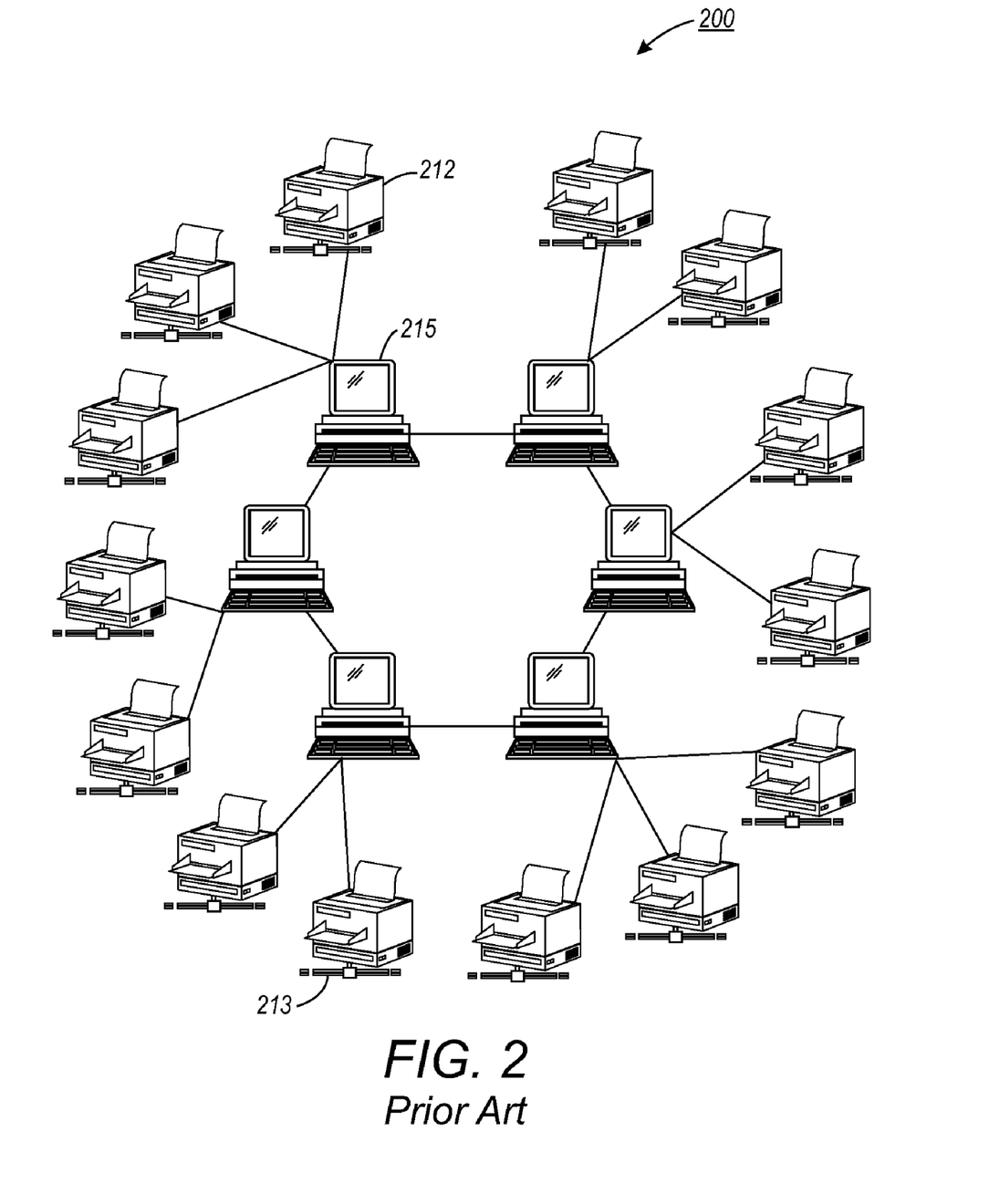
FIG. 2 illustrates a schematic diagram of a prior art peer aware network with distributed web hosting.

Prior art approaches provide some solutions to such deficiencies; however, through additional analysis and prototyping, significant improvements to the system have been introduced. FIG. 2 illustrates a peer aware network 200 with distributed web hosting. The peer aware network 200 includes a number of multi-function devices such as devices 212 and 213 associated with one or more proxy computers 215. The proxy computers 215 manage the registrations that are stored on the individual multi-function devices 212 and 213. The proxy computers 215 also act as proxies between the multi-function device 212 and 213 and the actual service hence communications must be routed through the proxy computer 215. The multi-function device to EIP service traffic can be proxied via the proxy computer 215 which slows access to the individual EIP services and increases network traffic.

Based on the foregoing, it is believed that a need exists for enabling a fleet of multi-function devices to dynamically discover an EIP service and auto populate service options displayable to a user or a group of users. A need also exists for filtering EIP services based on a corporate policy in order to allow access to enhanced services, as described in greater detailed herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring a multi-function device (MFD) such as a printer, scanner, photocopy machine, fax machine, or a combination thereof.

It is another aspect of the present invention to provide for a method and system for enabling a fleet of multi-function devices to dynamically discover an EIP service and auto populate user service options.

It is a further aspect of the present invention to provide for a method and system for filtering EIP services based on a corporate policy.

The aforementioned aspects and other objectives and advantages can now be achieved as described herein. A method and system are disclosed for enabling an automatic service sharing and custom user interface features in a fleet of multi-function devices. EIP services can be registered with respect to a peer-to-peer discovery subsystem associated with an MFD-grid infrastructure. The EIP service registration information can be submitted and stored in the MFD-grid infrastructure. The MFD's can be equipped with an enterprise EIP client that can query the peer-to-peer discovery subsystem and apply a corporate policy. The peer-to-peer discovery subsystem can detect best instance of the service based on loading and availability factors and then return a reference with respect to the services to a multifunction device user in order to allow access to a better service. The MFD-grid infrastructure utilizes a distributed file system therefore the service registrations cannot be lost and replicated thereby eliminating inconsistent information and race conditions.

The services can be made immediately available to all MFD's in the fleet (depending on the policy) because the MFD queries the discovery subsystem based on user requirements. The MFD-grid infrastructure can access dynamic service usage metrics so that a "live" load balancing can be accomplished. An access list or assigned user roles may also be utilized to determine services displayable to the user(s). The services may also be filtered based on the corporate policy. The EIP services can be directly registered in the MFD-grid infrastructure in order to potentially speed up access to the individual EIP services and to reduce network traffic. Such an approach enables a fleet of MFD's to dynamically discover EIP services and auto populate service options for a user or a group of users, thereby providing enhanced flexibility, reduced cost and complexity, and improved speed with respect to the networked MFD's.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 3:
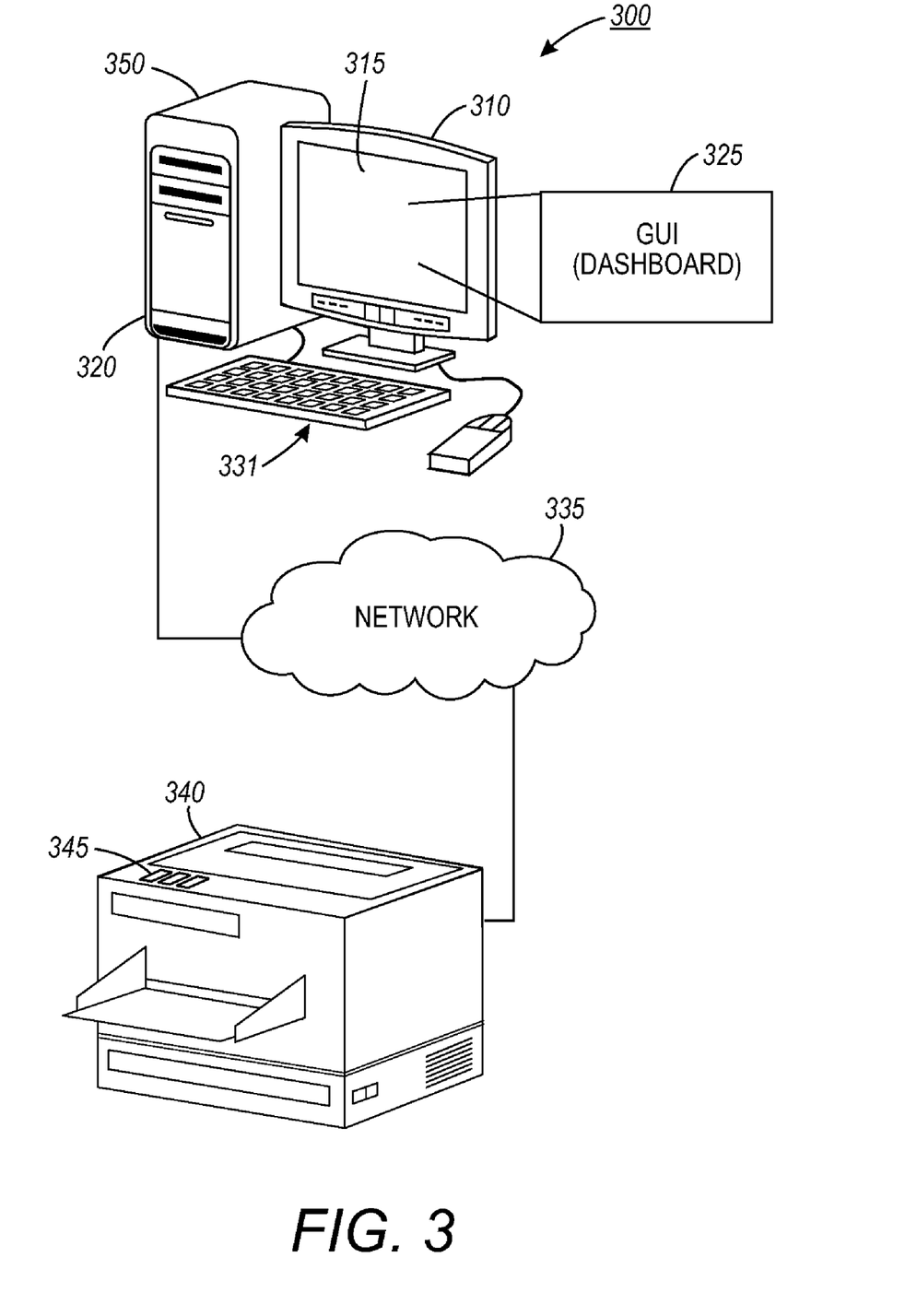
FIG. 3 illustrates an example of a data-processing system, including a GUI and supporting dashboard, in accordance with an embodiment.

FIG. 3 illustrates a system 300 as an exemplary diagram of a data processing environment in which embodiments of the present invention may be implemented. It should be appreciated that the configuration of system 300 shown in FIG. 3 is only illustrative and is not intended to assert or imply any limitation with regard to the environments in which aspects or embodiments of the present invention may be implemented. Many modifications to the depicted environments may be made without departing from the spirit and scope of the present invention.

System 300 includes a MFD 340 coupled to a data-processing apparatus 310 through a network 335. The data-processing apparatus 310 may be, for example, a personal computer or other computing device, and generally includes a central processor 320, a display device 315, a keyboard 331, and a pointing device (e.g., mouse, track ball, pen device, or the like). Additional input/output devices such as the MFD 340 may be included in association with the data-processing apparatus 310 as desired. Internally, the data-processing apparatus 310 may include, for example, a processor, a data bus coupled to the processor, and so forth.

Note that as utilized herein, the term multi-function device (including the acronym MFD) may refer to an apparatus or system such as a printer, scanner, fax machine, copy machine, etc., and/or a combination thereof. Preferably, MFD 340 is capable of multiple rendering functions such as printing, copying, scanning, faxing, etc. In some embodiments, MFD 340 may be implemented with a single rendering function such as printing. In other embodiments, MFD 340 can be configured to provide multiple rendering functions such as scanning, faxing, printing and copying. Note that the MFD's 342 and 344 described in greater detail herein are analogous or similar to MFD 340.

A non-limiting example of an MFD that can be utilized as MFD 340, 342 and/or 344 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as MFD 340, 342 and/or 344 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as MFD 340, 342 and/or 344 is disclosed in U.S. Pat. No. 5,920,405, entitled "Multifunction Device with Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 310 can be coupled to the MFD 340 through a computer network 335. Network 335 may employ any network topology, transmission medium, or network protocol. Network 335 may include connections such as wire, wireless communication links, or fiber optic cables. The MFD 340 includes a user interface 345 such as a panel menu. The panel menu may be used to select features and enter other data in the MFD 340. Such interfaces may include, for example, touch screens having touch activated keys for navigating through an option menu or the like.

An MFD driver program can be installed on the data-processing apparatus 310 and can reside on the host device's hard drive 350. The MFD driver program may be activated through an application interface so that a user may generate a print job with the MFD driver for processing by the MFD 340. The MFD 340 also includes a GUI 345 for communicating MFD features for processing, for example, a print job to a user and accepting the user's selection of available MFD features. The GUI 345 generally displays information and receives data through the device display and/or keyboard/mouse combination. The interface 345 also serves to display results, whereupon the user may supply additional inputs or terminate a given session. The data-processing apparatus 310 can be, for example, any computing device capable of being integrated within a network such as a PDA, personal computer, cellular telephone, point-of-sale terminal, server, etc.

Note that in one embodiment, the GUI 345 may display a dashboard, which is a visualization tool that provides graphical depictions of current key performance indicators in order to enable faster response to changes in areas such as, for example, sales, customer relations, performance assessments, and inventory levels. Thus, a dashboard is a term used generally to refer to a web-based technology page on which real time information is collated from various sources in the business. The metaphor of dashboard emphasizes the nature of the data being displayed on the page; it is a real-time analysis as to how a business is operating, just like on an automobile dashboard real time information is displayed about the performance of that vehicle. One example of a dashboard that GUI 345 may support is an Enterprise EIP (Extensible Interface Platform) dashboard. EIP is generally a software platform based on, for example, Web standards, which allows independent software vendors and developers to create customized document workflow applications for MFD and other products.

The following description is presented with respect to embodiments of the present invention, which can be embodied in the context of a data-processing apparatus 310 and MFD 340 depicted in FIG. 3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
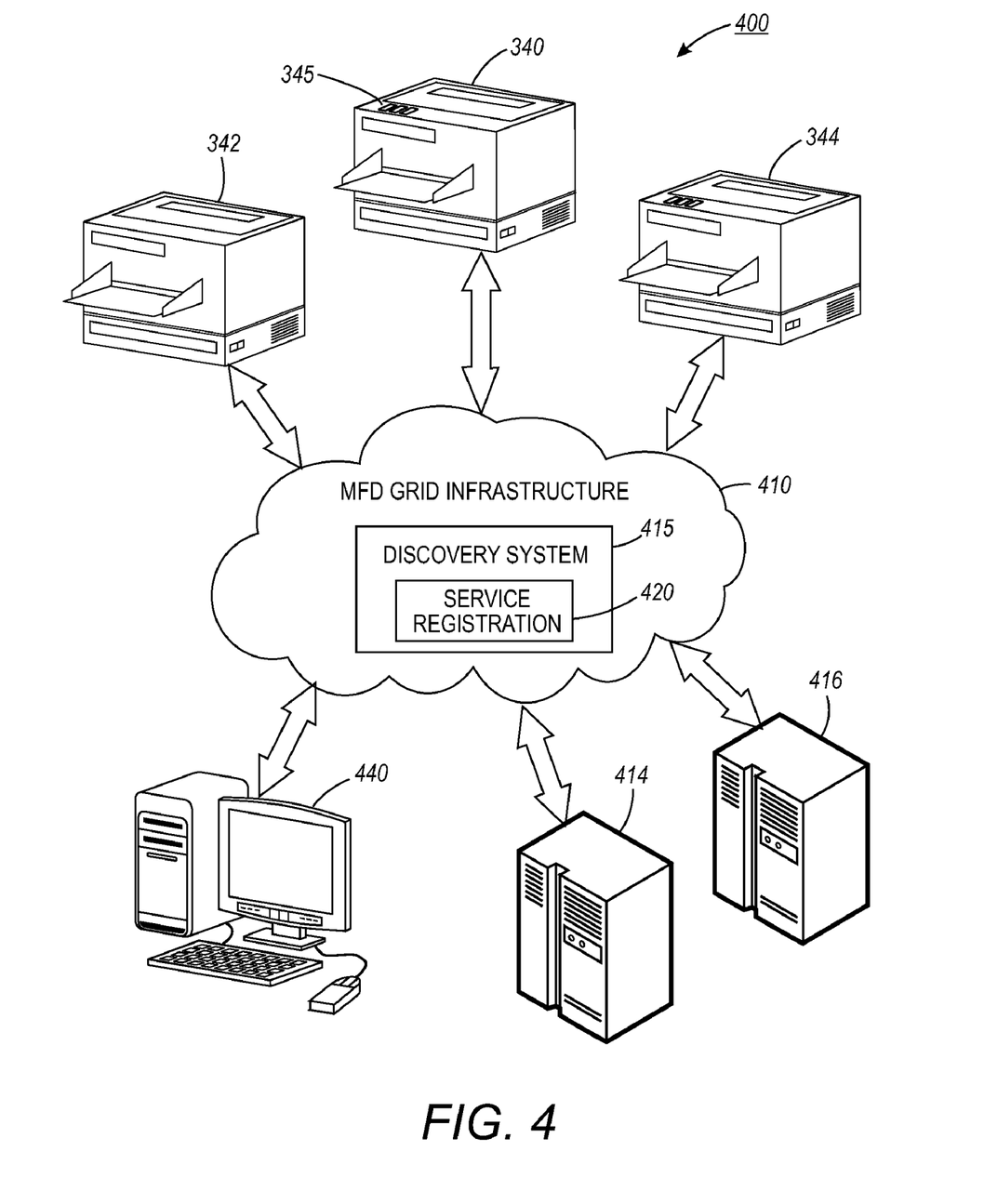
FIG. 4 illustrates a graphical representation of an enterprise EIP network, in accordance with an embodiment.

FIG. 4 illustrates a graphical representation of an Enterprise EIP (Extensible Interface Platform) network 400, in accordance with an embodiment. Note that in FIGS. 3-5, identical or similar blocks are generally indicated by identical reference numerals. The Enterprise EIP network 400 generally includes an MFD-grid infrastructure 410 associated with one or more multi-function devices 340, 342 and 344, an EEIP client 440 and EIP servers 414 and 416. The EEIP client 440 may be, for example, one or more personal computers or a network of computers. Data-processing system 310 depicted in FIG. 3 can be, for example, an EEIP client. Alternatively, data-processing system 310 can be implemented as EIP servers, depending upon design considerations. The multi-function devices 340, 342 and 344 can be located remotely with respect to each other, or alternatively, they may be located locally with respect to each other such as, for example, at a print shop or in an office environment.

In general, the grid infrastructure is a complex combination of a number of capabilities and resources identified for a specific problem and environment being addressed. The MFD-grid infrastructure 410 allows multiple interconnected computers to work together on large grid applications. The computational problem may be divided into several smaller, more manageable jobs or tasks in order to feasibly manage such overwhelming amounts of computational processing. The MFD-grid infrastructure 410 allows for shared storage across a plurality of nodes within the network 400. In this way, data may be stored remotely, in the form of a backup, for example, and allow large amounts of data to be virtually stored by a single node. The grid infrastructure may 410 comprise a combination of various network configurations having fewer or more client-servers, or alternate client-server configurations.

The EIP services can be provided by an EIP software module associated with the EIP server 414 and 416 to create personalized and customized document management solutions, which can be accessible from the multi-function device user interface 345. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

The enterprise EIP network 400 enable the fleet of multi-function devices 340, 342 and 344 to dynamically discover EIP services and auto populate the service options displayed to the user through the user interface 345. The MFD is an office machine which incorporates the functionality of multiple devices in one, so as to provide centralized document management, document distribution and production in a large-office setting, and the like. The typical MFD may act as a combination of a printer, scanner, photocopier, fax, and e-mail. While three multi-function devices 340, 342 and 344 are shown by way of example, it is to be appreciated that any number of rendering devices may be linked to the network such as two, four, six or more rendering devices. In general, the multi-function devices 340, 342 and 344 can be utilized to perform a rendering output function (e.g., printing, scanning, copying, faxing, etc) within a networked environment. Note that multi-function devices 340, 342 and 344 are generally analogous to one another.

The EIP servers 414 and 416 provide EIP services to the EIP enabled multi-function devices 340, 342 and 344 associated with the peer-to-peer network 400. The multi-function devices 340, 342 and 344 can be equipped with the enterprise EIP client 440 and the EIP services can be registered with the peer-to-peer discovery subsystem 415 which is part of the MFD-grid infrastructure 410. Note that the discovery subsystem 415 can be provided as a module (e.g., software module) or a group of such modules. The EIP client 440 can query the discovery subsystem 415, which can apply the corporate policy, detect best instance of the service based on loading, and availability factors. The EIP client 440 then returns references to the services to display to the MFD user. The references can allow access to the best service without the need to being routed through a proxy.

Note that the user interface as utilized herein generally refers to a type of environment that represents programs, files, options and so forth by means of graphically displayed icons, menus, and dialog boxes on a screen. The input device of the multi-function devices 340, 342 and 344 may be a local user interface such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The EIP registration information 420 can be submitted and stored to the MFD-grid infrastructure 410. The MFD-grid discovery subsystem 415 utilizes distributed file system therefore the service registrations 420 cannot be lost and replicated. The services can be immediately available to the multi-function devices 340, 342 and 344 in the fleet (depending on policy) because the multi-function devices 340, 342 and 344 query the discovery subsystem 415 when a user wants to utilize the services. Note that the MFD-grid infrastructure 410 can also be provided as a module (e.g., software module) or a group of such modules.

The MFD-grid infrastructure 410 has access to dynamic service usage metrics so "live" load balancing can be accomplished. The access lists or assigned user roles can be utilized to determine the services that are displayed to the user. The prototype utilizes radio frequency identification (REID) tags to identify a user's role and the services can be filtered based on the corporate policy. An example of such a policy can be certain EIP services are not allowed after business hours. Such an approach eliminates the need for the proxy system thereby potentially speeding up access to the individual EIP services and reducing network traffic.

Figure 5:
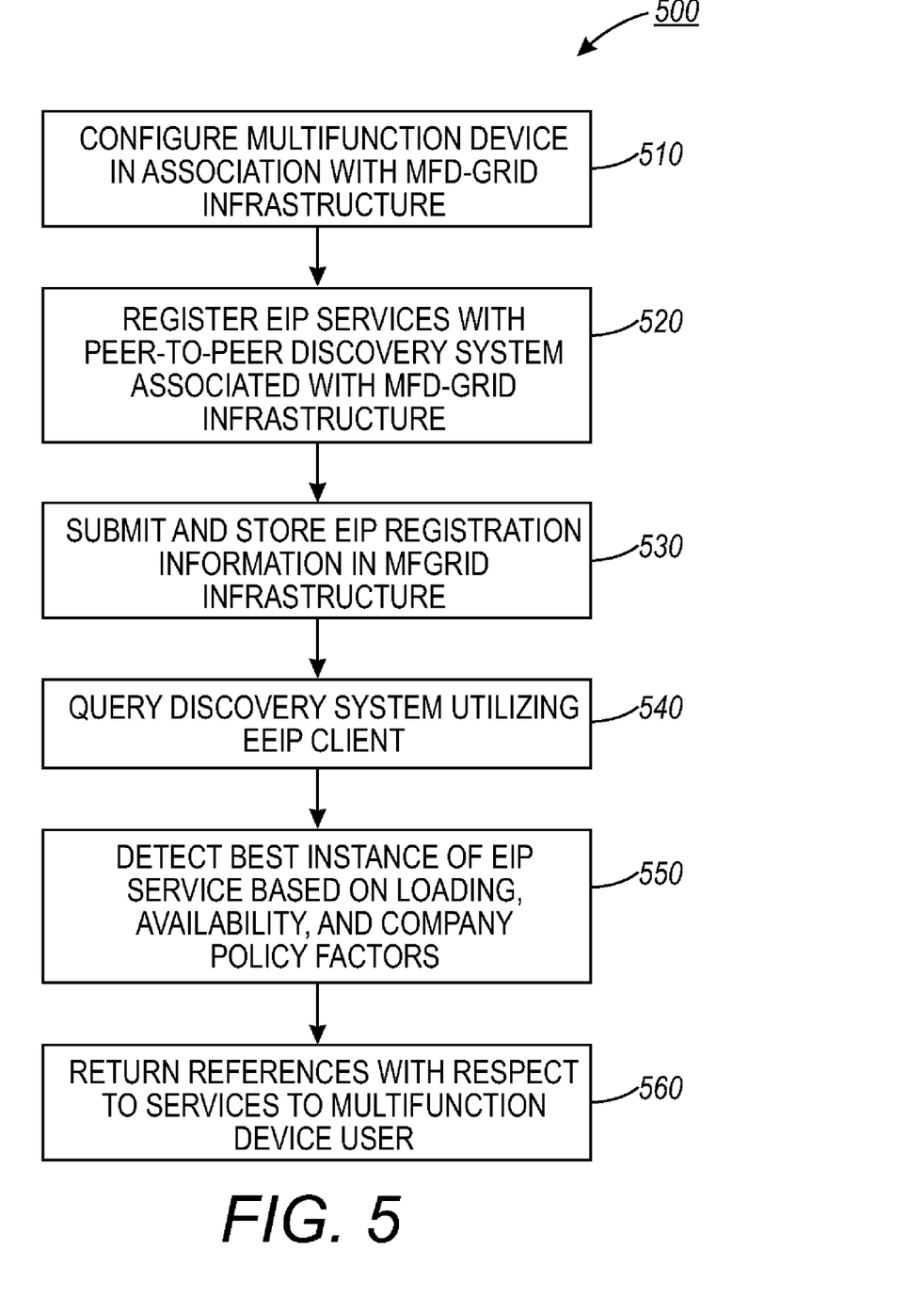
FIG. 5 illustrates a flow chart of operations illustrating logical operational steps of a method for dynamically discovering EIP services and auto populating service options in a fleet of multi-function devices, in accordance with an embodiment.

FIG. 5 illustrates a flow chart of operations illustrating logical operational steps of a method 500 for dynamically discovering EIP services and auto populating service options in a fleet of MFD, in accordance with an embodiment. The multi-function devices 340, 342 and 344 can be configured in association with the MFD-grid infrastructure 410, as depicted at block 510. The EIP services can be registered to the peer-to-peer discovery subsystem 415 associated with the MFD-grid infrastructure 410, as illustrated at block 520. Thereafter, the EIP registration information 420 can be submitted and stored to the MFD-grid infrastructure 410, as indicated at block 530. The discovery subsystem 415 can be queried utilizing the EEIP client 440, as depicted at block 540. The best instance of the EIP service can be detected based on loading and availability factors, as illustrated at block 550. The references to the services can be returned in order to display to the MFD user, as indicated at block 560.

The user receives the latest information known to the system 415 and hence the registrations are not replicated in more than one place eliminating inconsistent information and race conditions. It is believed that by utilizing the system and approach described herein, the EIP services can be dynamically discovered by the fleet of multi-function devices and the service options can be auto populated and displayed to the user in the MFD user interface 345.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system or apparatus including, but not limited to, personal computers, servers, workstations, network computers, main frame computers, routers, switches, Personal Digital Assistants (PDA's), telephones, and any other system capable of processing, transmitting, receiving, capturing and/or storing data. Thus, the data-processing apparatus 310 depicted in FIG. 3, for example, may equally be implemented as PDA, cellular telephone, Smartphone, laptop computer, iPhone, Blackberry type device as well as other types of personal or desktop computers.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for automatic service sharing, said method comprising:
   automatically registering a custom service with respect to a plurality of multi-function devices in a peer-to-peer discovery subsystem of a network;
   associating an extensible interface platform client with said plurality of multi-function devices;
   querying, utilizing said extensible interface platform associated with said plurality of multi-function devices, of said peer-to-peer discovery subsystem based on a particular policy;
   detecting an optimal instance of said custom service based on a loading factor and an availability factor, wherein said peer-to-peer discovery subsystem returns a reference with respect to said custom service to enable automatic service sharing and auto populating a user interface display on said plurality of multi-function devices with at least one service option from said customer service in said plurality of multi-function devices;
   associating said peer-to-peer discovery subsystem with a grid infrastructure; and
   storing in said grid structure, information indicative of a registration of said customer service.

2. The method of claim 1 wherein said custom service comprises an extensible interface platform service.

3. The method of claim 1 further comprising configuring said peer-to-peer discovery subsystem to include a distributed file system that ensures information associated with automatically registering said custom service cannot be lost and replicated.

4. The method of claim 1 further comprising configuring said plurality of multi-function devices in association with said grid infrastructure in order to speed access to said custom service and reduce network traffic associated with said network.

5. The method of claim 1 further comprising filtering said custom service based on said particular policy.

6. The method of claim 1 further comprising querying said peer-to-peer discovery subsystem based on a particular data input by a user so that said custom service is immediately available to said plurality of multi-function devices based on said particular policy.

7. The method of claim 1 further comprising accessing said reference with respect to said custom service based on data contained in an access list.

8. A system for automatic service sharing, said system comprising:
   a processor;
   a data bus coupled to said processor; and
   a computer-usable medium embodying computer code, said computer-usable medium being coupled to said data bus, said computer program code comprising instructions executable by said processor and configured for:

automatically registering a custom service with respect to a plurality of multi-function devices in a peer-to-peer discovery subsystem of a network;

associating an extensible interface platform client with said plurality of multi-function devices;

querying, utilizing said extensive interface platform associated with said plurality of multi-function devices, of said peer-to-peer discovery subsystem based on a particular policy;

detecting an optimal instance of said custom service based on a loading factor and an availability factor, wherein said peer-to-peer discovery subsystem returns a reference with respect to said custom service to enable automatic service sharing and auto populating a user interface display on said plurality of multi-function devices with at least one service option from said customer service;

associating said peer-to-peer discovery subsystem with a grid infrastructure; and storing in said grid structure, information indicative of a registration of said customer service.

9. The system of claim 8 wherein said custom service comprises an extensible interface platform service.

10. The system of claim 8 wherein said instructions are further configured for modifying said peer-to-peer discovery subsystem to include a distributed file system that ensures information associated with automatically registering said custom service cannot be lost and replicated.

11. The system of claim 8 wherein said instructions are further configured for associating said plurality of multi-function devices with said grid infrastructure in order to speed access to said custom service and reduce network traffic associated with said network.

12. The system of claim 8 wherein said instructions are further configured for filtering said custom service based on said particular policy.

13. The system of claim 8 wherein said instructions are further configured for querying said peer-to-peer discovery subsystem based on a particular data input by a user so that said custom service is immediately available to said plurality of multi-function devices based on said particular policy.

14. The system of claim 8 wherein said instructions are further configured for accessing said reference with respect to said custom service based on data contained in an access list.

15. A non-transitory computer-usable medium for automatic service sharing, said computer-usable medium embodying computer program code, said computer program code comprising computer executable instructions configured for:

automatically registering a custom service with respect to a plurality of multi-function devices in a peer-to-peer discovery subsystem of a network;

associating an extensible interface platform client with said plurality of multi-function device;

querying, utilizing said extensible interface platform associated with said plurality of multi-function devices, of said peer-to-peer discovery subsystem based on a particular policy; and detecting an optimal instance of said custom service based on a loading factor and an availability factor, wherein said peer-to-peer discovery subsystem returns a reference with respect to said custom service to enable automatic service sharing and auto populating a user interface display on said plurality of multi-function devices with of at least one service option from said customer service in said plurality of multi-function devices with at least one service option from said customer service;

associating said peer-to-peer discovery subsystem with a grid infrastructure; and storing in said grid structure, information indicative of a registration of said customer service.

16. The non-transitory computer-usable medium of claim 15 herein said embodied computer program code further comprises computer executable instructions configured for modifying said peer-to-peer discovery subsystem to include a distributed file system that ensures information associated with automatically registering said custom service cannot be lost and replicated.

17. The non-transitory computer-usable medium of claim 15 wherein said embodied computer program code further comprises computer executable instructions configured for:

querying said peer-to-peer discovery subsystem based on a particular data input by a user so that said custom service is immediately available to said plurality of multi-function devices based on said particular policy; and accessing said reference with respect to said custom service based on data contained in an access list.

* * * * *